(12) United States Patent
de Backer et al.

(10) Patent No.: US 6,266,745 B1
(45) Date of Patent: Jul. 24, 2001

(54) METHOD AND SYSTEM IN A DISTRIBUTED SHARED-MEMORY DATA PROCESSING SYSTEM FOR DETERMINING UTILIZATION OF NODES BY EACH EXECUTED THREAD

(75) Inventors: Philippe L. de Backer; Mark E. Dean; Ronald Lynn Rockhold, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/146,391

(22) Filed: Sep. 4, 1998

(51) Int. Cl.⁷ ............................. G06F 12/00; G06F 9/30
(52) U.S. Cl. .................... 711/147; 711/148; 711/156; 712/215
(58) Field of Search .................... 711/147, 148, 711/141, 154, 156; 712/215

(56) References Cited

U.S. PATENT DOCUMENTS 5,802,585 * 9/1998 Scales et al. .................... 711/154
5,974,536 * 10/1999 Richardson .................... 712/215
6,035,377 * 3/2000 James et al. .................... 711/147

* cited by examiner

Primary Examiner—Do Hyun Yoo
Assistant Examiner—Kimberly McLean
(74) Attorney, Agent, or Firm—Richard A. Henkler; Bracewell & Patterson, L.L.P.

(57) ABSTRACT

A method and system in a distributed shared-memory data processing system are disclosed for determining a utilization of each of a plurality of coupled processing nodes by one of a plurality of executed threads. The system includes a single operating system being executing simultaneously by a plurality of processors included within each of the processing nodes. The operating system processes one of the plurality of threads utilizing one of the plurality of nodes. During the processing, for each of the nodes, a quantity of times the one of the plurality of threads accesses a shared-memory included with each of the plurality of nodes is determined.

12 Claims, 5 Drawing Sheets

METHOD AND SYSTEM IN A DISTRIBUTED SHARED-MEMORY DATA PROCESSING SYSTEM FOR DETERMINING UTILIZATION OF NODES BY EACH EXECUTED THREAD

BACKGROUND OF THE INVENTION

1. Technical Field

The present invention relates to data processing systems and, in particular, to a distributed shared-memory data processing system for determining a utilization of each of a plurality of processing nodes in the system by one of plurality of threads. Still more particularly, the present invention relates to a method and system in a distributed shared-memory data processing system for determining a utilization of each of a plurality of processing nodes in the system by one of plurality of threads by determining a quantity of times the thread accesses each shared-memory in the system.

2. Description of the Related Art

One type of data processing system is a uniprocessor system which has only one central processing unit (CPU) which executes an operating system. This type of system is typically utilized in older computer systems.

Another type of data processing system is a multiprocessor system which has more than one CPU. A particular type of multiprocessor system is a symmetric multiprocessor system (SMP). An SMP system includes a plurality of processors, each having equal access to shared-memory and input/output (I/O) devices shared by the processors. In an SMP system, a single operating system is executed simultaneously by the plurality of processors. The operating system can divide a software application into separate processes that may be executed simultaneously on all of the processors in the system. In this manner, because different processes of the application can be simultaneously executed, the application can be executed in an SMP system faster than it could be executed in a uniprocessor system.

A multiprocessor system must have a method and system for keeping track of the different processes being executed by the different processors. The multiprocessor system utilizes threads to represent the separately dispatchable units of these processes. Threads are utilized by the operating system to keep track of the location and status of each unit of work executing on the plurality of processors.

Multiple SMP systems can be clustered together to form a more powerful data processing system. A clustered SMP system includes multiple nodes which are coupled together via an interconnection network. Each node includes one or more processors and a shared-memory which may be accessed equally by the processors within the node.

One method and system for maintaining a cluster of multiple SMP systems is called a distributed shared-memory system. A distributed shared-memory system is also called a non-uniform memory access (NUMA) system. A NUMA system includes multiple nodes as described above. Each processor in a node in the NUMA system may access the shared-memory in any of the other nodes in the system. Therefore, the memory access may be non-uniform across the nodes.

In a symmetric multiprocessor system, a single operating system is simultaneously executed by a plurality of interconnected processors. The operating system selects threads to dispatch to various processors within the SMP data processing system. A part of the operating system executing on a first processor may select a particular thread to process. The first processor may decide that the selected thread should be executed by any of the other processors in the data processing system. However, typically, the first processor will decide that the selected thread will be executed by the first processor. In the event a processor other than the first processor is selected to execute the thread, the first processor notifies the other processor that the other processor has been selected to execute the thread. The other processor then selects this thread. The other processor dispatches and executes the thread. In this manner, a processor in the system may select any of the processors in the system to execute a thread. The processor selected to execute a thread then dispatches and executes that thread.

To optimize performance of a multiprocessor system, load balancing determinations may be made. These load balance determinations are typically made utilizing a measured activity of each processor in the system. Determinations then can be made regarding processors which might remain idle for extended periods of time compared to the other processors in the system.

However, in NUMA systems, balancing the load on the processors by moving threads to different nodes must be done with great care. A thread's LOAM)/STORE references, the memory references, might cross node boundaries, i.e. might be remote memory references. A remote memory reference is a reference from one processor in a first node to a shared-memory location in a second node. A local memory reference is a reference from one processor in a first node to a shared-memory location in the first node. Remote memory references result: in poor performance.

Processor utilization data alone might call for redistributing threads by balancing the load on each processor as evenly as possible. However, balancing the load utilizing only processor utilization data could increase processor utilization while actually reducing throughput of the system if the wrong threads are redistributed.

Therefore a need exists for a method and system in a data processing system for determining utilization of each of a plurality of nodes in the data processing system by each thread which is executed.

SUMMARY OF THE INVENTION

It is therefore one object of the present invention to provide an improved data processing system.

It is another object of the present invention to provide a method and system in a distributed shared-memory data processing system for determining a utilization of each of a plurality of processing nodes in the system by one of a plurality of threads.

It is yet another object of the present invention to provide a method and system in a distributed shared-memory data processing system for determining a utilization of each of a plurality of processing nodes in the system by one of plurality of threads by determining a quantity of times the thread accesses each shared-memory in the system.

The foregoing objects are achieved as is now described. A method and system in a distributed shared-memory data processing system are disclosed for determining a utilization of each of EL plurality of coupled processing nodes by one of a plurality of executed threads. The system includes a single operating system being executing simultaneously by a plurality of processors included within each of the processing nodes. The operating system processes one of the plurality of threads utilizing one of the plurality of nodes. During the processing, for each of the nodes, a quantity of times the one of the plurality of threads accesses a shared-memory included with each of the plurality of nodes is determined.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF ILLUSTRATIVE EMBODIMENT

Figure 1:
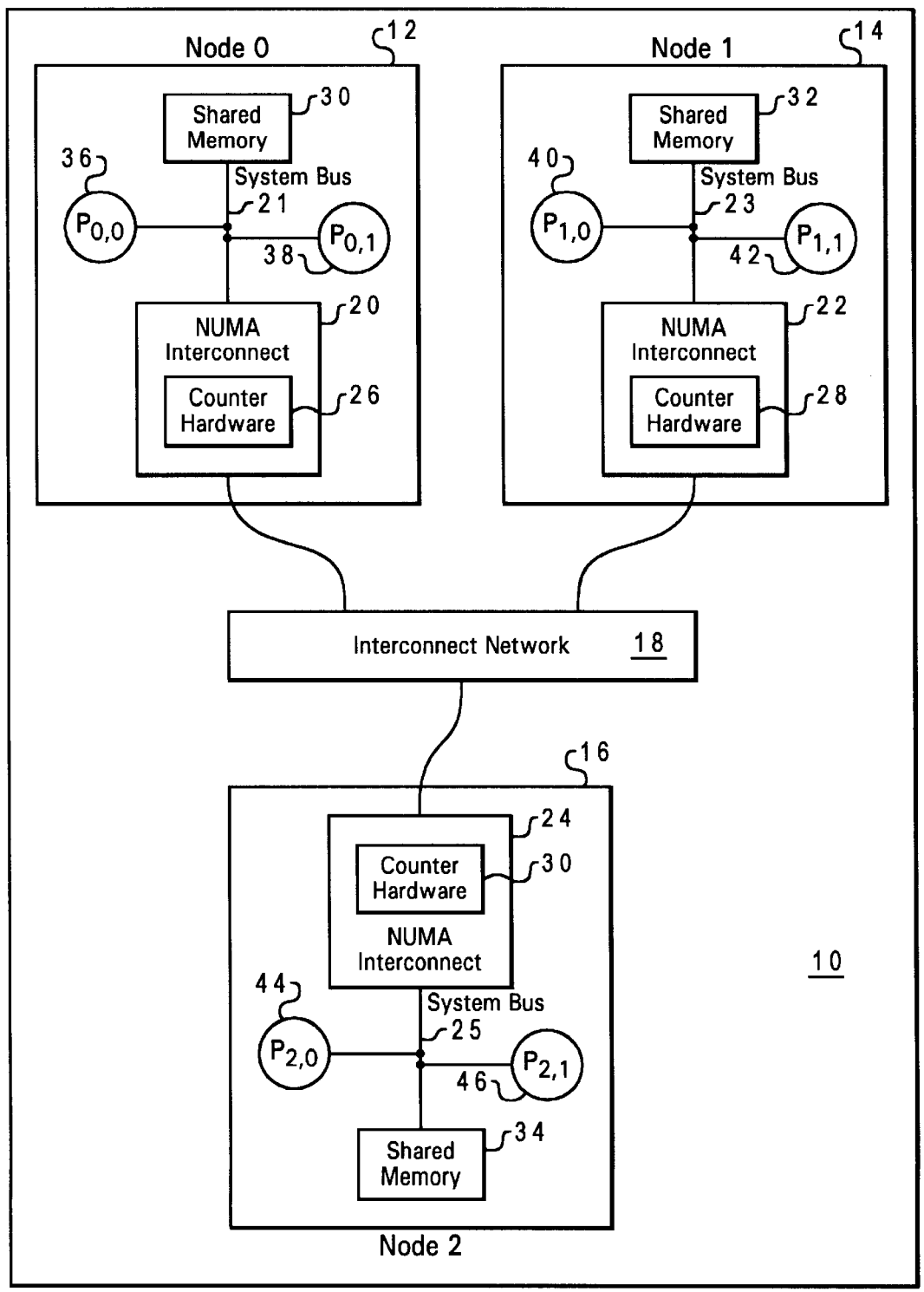
FIG. 1 depicts a block diagram of a distributed shared-memory data processing system embodying the present invention.

A preferred embodiment of the present invention and its advantages are better understood by referring to FIGS. 1–6 of the drawings, like numerals being used for like and corresponding parts of the accompanying drawings.

The method and system of the present invention may be utilized to determine the utilization of each of a plurality of nodes in a distributed shared-memory data processing system by each thread which is executed by the system. These node processing statistics are determined at run-time. The statistics show, for each migrateable thread, that particular thread's propensity to utilize the shared-memory from each of the nodes in the system. The statistics include the quantity of times a particular processor accessed a shared-memory in each of the nodes in the system. This data is maintained for each thread. Therefore, for each thread, a counter value is maintained and accumulated for each node which is equal to the quantity of times this thread accessed the shared-memory for that node.

These counter values are maintained utilizing an array of counters. An array of counters is established within each node in the system. Each counter array includes a plurality of counters. Each counter is associated with one of the processors in the node which includes this counter array, and is also associated with one of each of the nodes in the system. Therefore, each counter is associated with both a processor and a node. Each counter represents the quantity of times the processor associated with the counter accessed shared-memory memory in the node also associated with the counter. Each counter array can be read by the process described below so that the counter values may be utilized to determine which threads might be migrated to another processor in order to improve throughput and performance of the system.

Whenever a new thread is about to be dispatched by a processor, the row of counters in the array associated with the processor is read. The current value of the counters in that row are stored and are associated with the current thread. The process of reading the counters resets the counters associated to a value of zero. The new thread is then dispatched, and becomes the currently running thread. While each transaction associated with the thread is processed, the counters accumulate the number of times their associated nodes were accessed by this thread. Then, when a different thread is selected to be dispatched on this processor, the row of counters associated with this processor is again read. The values previously stored associated with this thread are then added to the counter values determined for this processor. The total values for each node are again stored and are associated with this thread. The new thread is then dispatched.

In this manner, an accurate count is maintained for each thread being processed which includes the number of times that thread accessed shared-memory in a particular node. This information could be utilized to determine that a thread needs to be moved to a different processor.

FIG. 1 depicts a block diagram of a distributed shared-memory data processing system 10 embodying the present invention. System 10 includes a plurality processing nodes 12, 14, and 16 which are coupled together utilizing an interconnect network 18.

Each node 12, 14, and 16 includes a NUMA interconnect which includes counter hardware. For example, node 12 includes interconnect 20. Node 14 includes interconnect 22. Node 16 includes interconnect 24. Preferably, each interconnect 20, 22, or 24 is implemented utilizing SYNFINITY™ NUMA and SYNFINITY™ NET, both available from Fujitsu System Technologies of Campbell, Calif.

Each interconnect 20, 22, and 24 has been modified by adding counter hardware 26, 28, and. 30, respectively. Counter hardware 26, 28, and 30 is described in more detail in FIG. 2. Counter hardware 26, 28, and 30 is utilized to determine the quantity of times the processor in the node which includes the particular counter hardware accesses shared-memory in each of the nodes.

Each node also includes a plurality of processors coupled together with shared-memory and the interconnect via a system bus. Node 12 includes two processors 36, 38 and shared-memory 30 coupled to interconnect 20 via system bus 21. Node 14 includes two processors 40, 42 and shared-memory 32 coupled to interconnect 22 via system bus 23. Node 16 includes two processors 44, 46 and shared-memory 34 coupled to interconnect 24 via system bus 25.

Each processor in a node is granted equal access to the shared-memory in that node. A local memory access occurs when a processor accesses the shared-memory in the node which includes that processor. The shared-memory in the node is called the local shared-memory.

Each processor in a node may also access the shared-memory which is located in a node other than the node which includes that processor. A remote memory access occurs when a processor accesses the shared-memory in a node other than the one which includes that processor.

For example, when either processor 36 or 38 accesses shared-memory 30, it is a local memory access. When either processor 36 or 38 accesses either shared-memory 32 or 34, it is a remote memory access.

The present invention describes a method and system for determining the quantity of times each processor in system 10 accesses each of the shared-memories in system 10. Because each executed thread is associated with a particular processor, the quantity of time a particular thread assesses each of the shared-memories in system 10 may be determined.

Each thread that is executed in system 10 is executed on a selected processor. A thread includes a plurality of transactions which are passed from one node to another utilizing interconnect network 18. Each transaction is associated with its thread and includes both a processor identifier which identifies the processor on which the thread has been dispatched, and a memory address.

Figure 2:
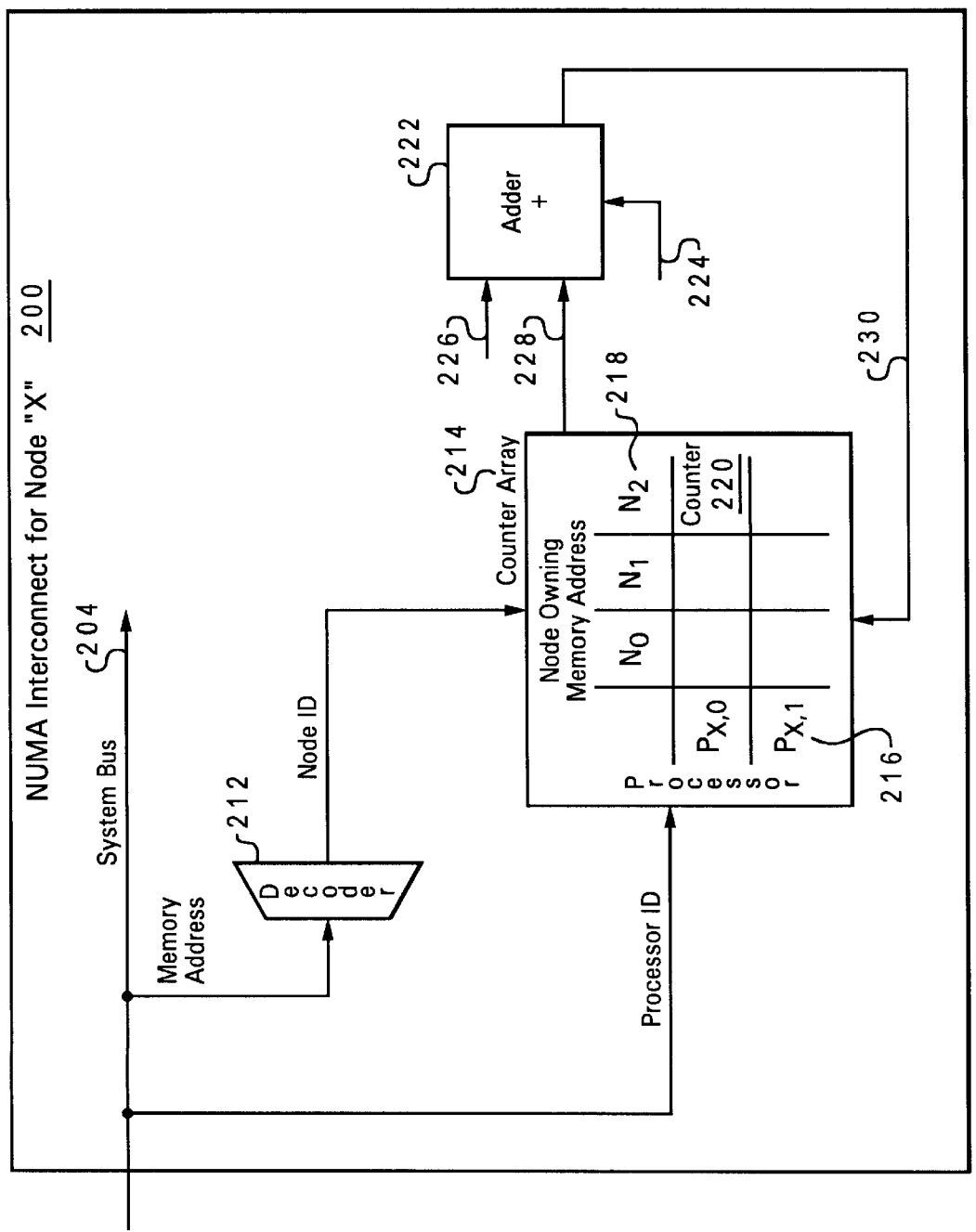
FIG. 2 illustrates a high-level block diagram of a counter hardware included within FIG. 1 in accordance with the method and system of the present invention.

FIG. 2 illustrates a high-level block diagram of counter hardware included within FIG. 1 in accordance with the method and system of the present invention. As each transaction is passed through interconnect network 18, it is monitored by interconnect 20, 22, and 24. FIG. 2 includes a generic interconnect 200 which may be utilized for each interconnect 20, 22, and 24. Interconnect 200 includes a system bus 204 which will be system bus 21, 23, or 25. Each transaction transmitted via system bus 204 includes a processor identifier and a memory address. The processor identifier is received directly within counter array 214. The processor identifier identifies the processor associated with each transaction. The processor identifier is utilized to select a particular row within counter array 214 which is associated with the received processor identifier.

A counter array in a particular node includes a row for each processor included within that node. For example, if interconnect 200 is implemented in node 12, one row of counter array will be associated with processor $_{0,0}$, or processor 36. The second row of counter array will be associated with processor $_{0,1}$, or processor 38. When a transaction is received which is associated with either processor $_{0,0}$ or processor $_{0,1}$, the appropriate row of counter array 214 will be selected.

The address of the shared-memory which this transaction must access is also included within this transaction. The memory address is received within decoder 212. Decoder 212 decodes the memory address associated with each transaction to determine the node which includes the shared-memory in which the memory address is located. The node identifier is then utilized to select a particular column within counter array 214 associated with the decoded node identifier.

Therefore, in this manner, the processor identifier and memory address associated with each transaction are utilized to determine a particular counter within counter array 214 to increment. The particular counter is determined by selecting the counter associated with both the process identifier and memory address. Adder 220 is clocked by clock 224 and receives a value of "1" and the current value of the selected counter via line 228 to increment the selected counter via line 230.

For example, if interconnect 200 is implemented in node 12, the processor identifier will be received for each transaction. If a received transaction includes a processor identifier which identifies either processor 36 or 38, the row of counter array 214 associated with that processor will be selected. In addition, decoder 212 will receive each memory address associated with each transaction. The memory address will be decoded to determine the node which includes the shared-memory associated with that memory address. Decoder 212 will then select the column of counter array 214 associated with the determined node. In this manner, when one of the counters of counter array 214 is associated with both the determined node identifier and either processor 36 or 38, that counter is selected and incremented.

For example, if processor 36 dispatches a thread which needs to access a memory location within shared-memory 34, each transaction associated with this thread will be associated with both processor 36 and an address in shared-memory 34. Counter hardware 26 will monitor transactions in interconnect 20. When the transaction described above is monitored, it is determined that it is associated with processor 36 and row 216 in counter array 214 will be selected. In addition, decoder 212 will determine that the memory address is associated with shared-memory 34 which is included within node 16. Decoder 212 will then select column 218. In this manner, only one counter, counter 220, is selected to be incremented.

Figure 3:
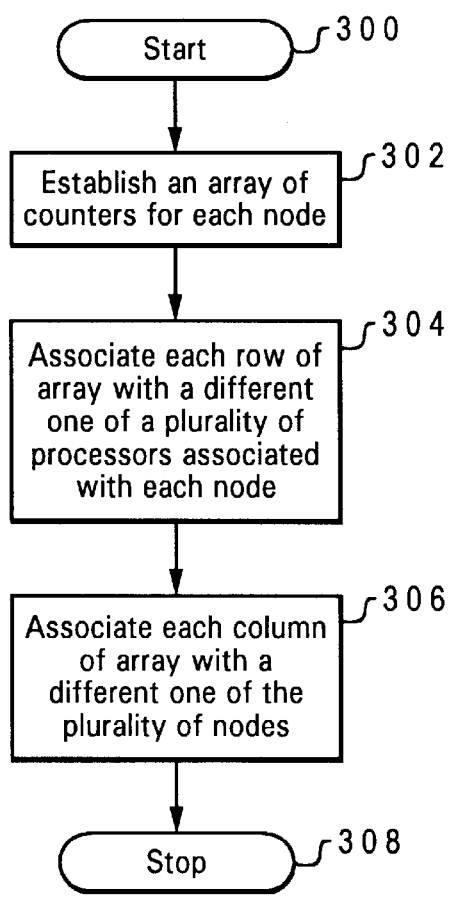
FIG. 3 is a high level flow chart illustrating the establishment of an array of counters within each node of FIG. 1 in accordance with the method and system of the present invention.

FIG. 3 is a high level flow chart illustrating the establishment of an array of counters within each node of FIG. 1 in accordance with the method and system of the present invention. The process starts as depicted at block 300 and thereafter passes to block 302 which illustrates an establishment of an array of counters for each node within the system. The process then passes to block 304 which depicts an association of each row of an array with a different one of a plurality of processors included within this node. For each node, a counter array has been established. The counter array for a particular node includes a row associated with each processor which is included within that particular node. Block 306, then, illustrates an association of each column of the array with a different one of a plurality of nodes. The process then terminates as illustrated at block 308. In this manner, a plurality of counters are established where each counter is associated with both a processor and a node.

Figure 4:
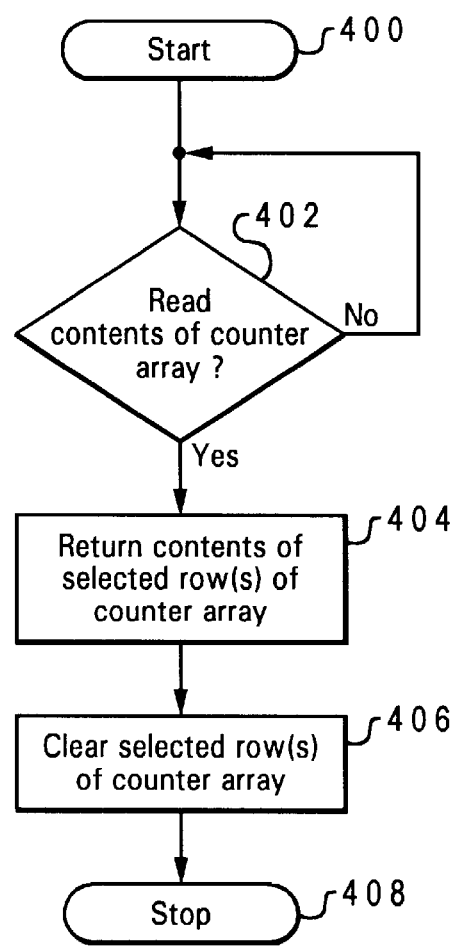
FIG. 4 is a high level flow chart depicting the process of the hardware reading one of the array of counters of FIG. 2 in accordance with the method and system of the present invention.

FIG. 4 is a high level flow chart depicting the process of the hardware reading one of the array of counters of FIG. 2 in accordance with the method and system of the present invention. The process starts as depicted at block 400 and thereafter passes to block 402 which illustrates a determination of whether or not contents of the counter array of a particular node are to be read. If a determination is made that contents of a counter array are not to be read, the process loops back to block 402. Referring again to block 402, if a determination is made that contents of an array are to be read, the process passes to block 404 which illustrates the reading of the contents of the selected row or rows of one of the counter arrays. Next, block 406 depicts the clearing, or resetting, of the row or rows whose contents were read. The counters are reset to a value of "0". The process then terminates as depicted at block 408. The process of FIG. 4 is executed within each node of the system for the counter array of that node.

Figure 5:
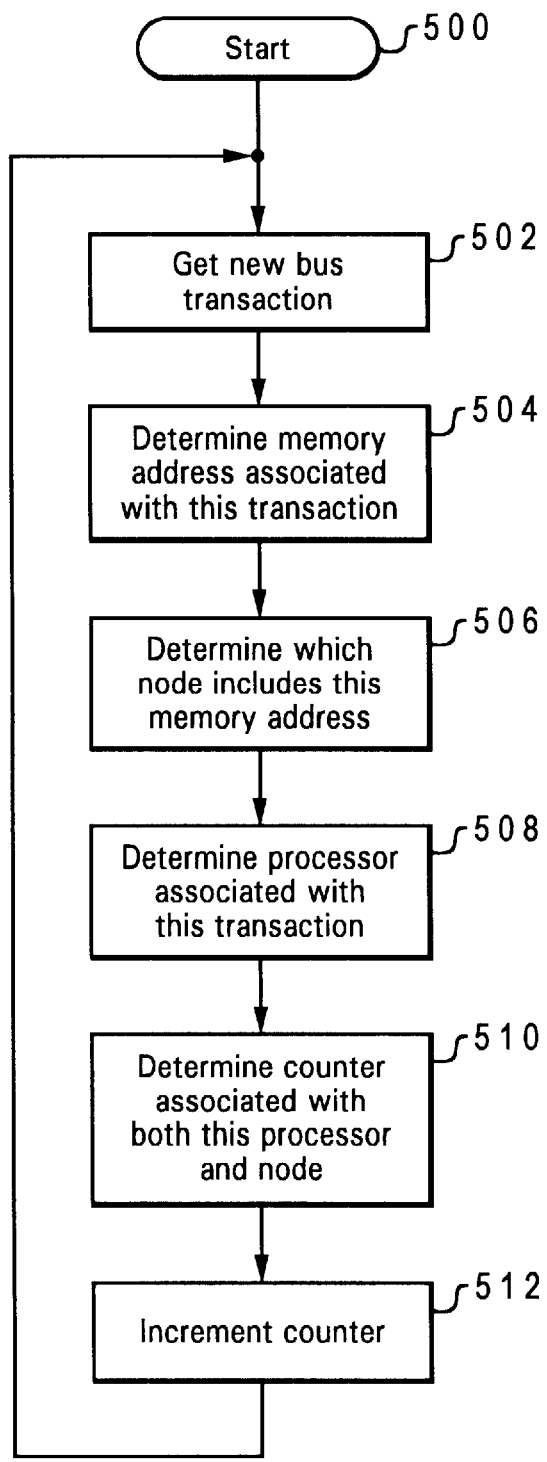
FIG. 5 is a high level flow chart illustrating the determination of a quantity of times a particular thread accesses shared-memory in a particular node in the distributed data processing system in accordance with the present invention.

FIG. 5 is a high level flow chart illustrating the determination of a quantity of times a particular thread accesses shared-memory in a particular node in the distributed data processing system in accordance with the present invention. The process starts as depicted at block 500 and thereafter passes to block 502 which illustrates the getting of a new bus transaction. A plurality of bus transactions are processed within the data processing system. Each transaction may be associated with one of the processors in the system and with a memory address. The processor for a particular transaction may be located in a first node, while the memory address for that transaction is, located and associated with a second node. Next, block 504 depicts a determination of a memory address associated with this transaction. Block 506 illustrates a determination of which node has shared-memory which is associated with and includes this memory address.

Thereafter, block 508 depicts a determination of a processor associated with this transaction. The process then passes to block 510 which illustrates a determination of a counter which is associated with the determined processor and node. The counter is associated with one of a plurality of counters. The one of the plurality of counters is, therefore, associated with the determined processor and node. This counter counts the number of times this thread, which was dispatched to the determined processor associated with this counter, accessed the determined node. The processor then passes to block 512 which illustrates the incrementing of this counter. The process then passes back to block 502.

Figure 6:
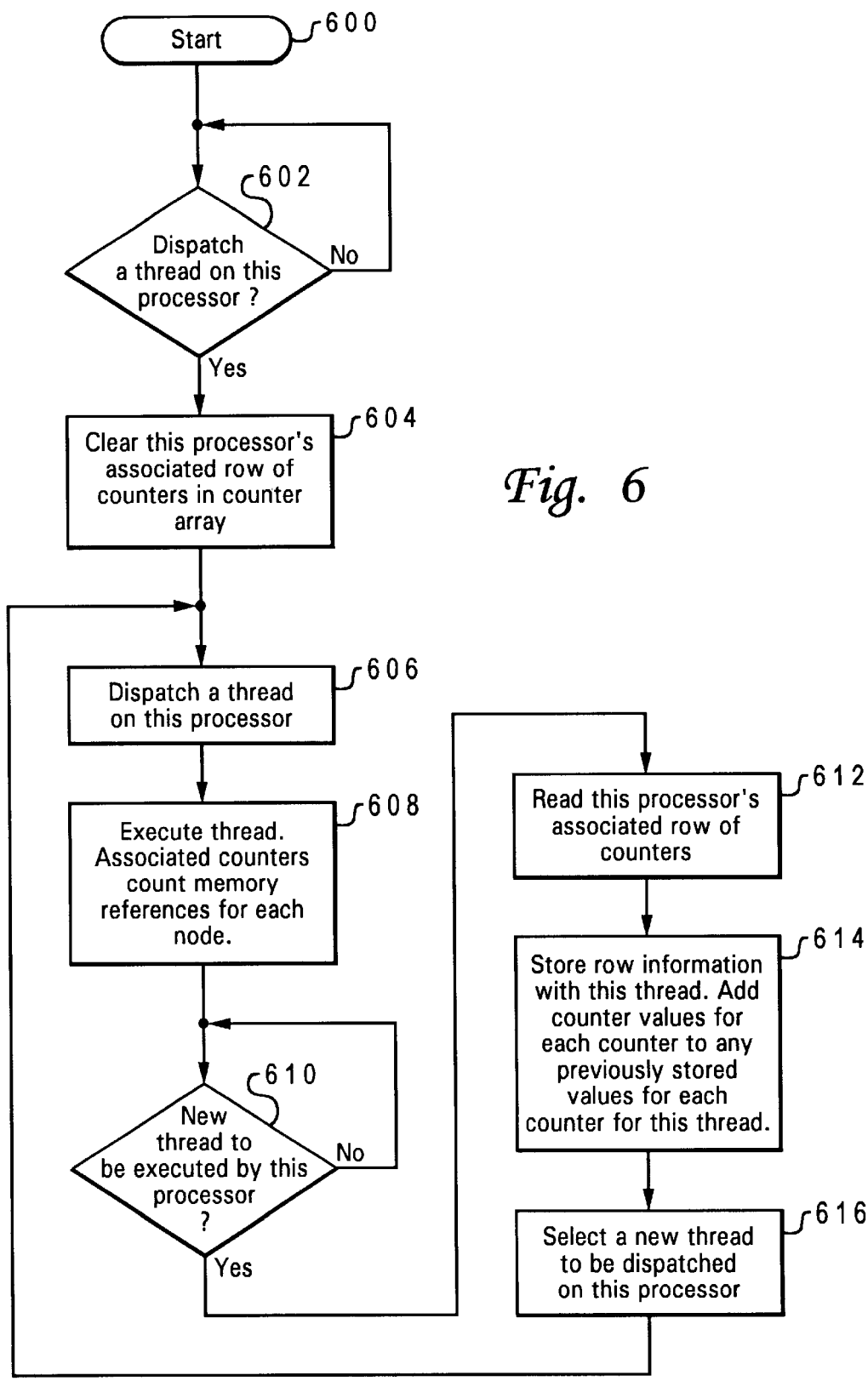
FIG. 6 is a high level flow chart depicting the accumulation of a total quantity of times a particular thread accesses each shared-memory in each of the nodes of the distributed data processing system in accordance with the present invention.

FIG. 6 is a high level flow chart depicting the accumulation of a total quantity of times a particular thread accesses each shared-memory in each of the nodes of the distributed data processing system in accordance with the present invention. The process of FIG. 6 is executed for each processor within each node of the data processing system. The process starts as depicted at block 600 and thereafter passes to block 602 which illustrates a determination of whether or not a thread is to be dispatched on this processor. If a determination is made that a thread is to be dispatched on this processor, the process loops back to block 602. Referring again to block 602, if a determination is made that a thread is not to be dispatched on this processor, the process passes to block 604 which depicts the clearing of this processor's associated row of counters in the counter array within the node in which this processor is located.

Next, block 606 illustrates the dispatching of a thread on this processor. Thereafter, block 608 depicts the execution of the thread. The counters associated with this processor count the memory references this thread makes to each node. The process then passes to block 610 which illustrates a determination of whether or not a new thread is to be executed by this processor. If a determination is made that a new thread is not to be executed by this processor, the process loops back to block 610. If a determination is made that a new thread is to be executed, the process passes to block 612 which depicts the reading of this processor's associated row of counters. When a row of counters is read, the hardware process causes the counters to be reset to zero as described in FIG. 4. Next, block 614 illustrates the storage of the row counter information with this thread. Any counter values already stored for each counter with this thread are added to the new counter values just read from the counters illustrated in block 612. The total counter values for each counter of the associated row is stored with the thread. Block 616 depicts a selection of a new thread to be dispatched on this processor. The process then passes back to block 606.

While a preferred embodiment has been particularly shown and described, it will be understood by those skilled in the art that various changes in form and detail may be made therein without departing from the spirit and scope of the present invention.

What is claimed is:

1. A method in a distributed shared-memory data processing system having a single operating system being executed simultaneously by a plurality of processors included within a plurality or coupled processing nodes for determining a utilization of each of said plurality of processing nodes by each of a plurality of threads being executed by a plurality of processors included within said plurality of nodes, said method comprising the steps of:

said operating system processing each of a plurality of threads utilizing one of said plurality of processors, wherein multiple ones of said plurality of threads are executed simultaneously;

for each of said plurality of nodes, establishing an array of counters including a plurality of counters;

for each one of said plurality of counters included within said array of counters, associating said each one of said plurality of counters with a different one of sped plurality of processors included within one of said plurality of nodes within which said array of counters is located and with a different one of said plurality of nodes, wherein said array includes a counter associated with each of said plurality of processors for each of said plurality of nodes;

associating each row of counters included in said counter array with a different one of said plurality of processors included in one of said plurality of nodes which includes said counter array; and during said processing, for each of said plurality of processors, determining a quantity of times each of said plurality of processors accesses a shared-memory included within each of said plurality of nodes utilizing said array of counters, wherein a separate quantity is determined for each of said plurality of processors and further wherein said quantity for each of said plurality of processors is a quantity of times one of said plurality of threads being executed by said each of said plurality of processors accessed said shared-memory.

2. The method according to claim 1, wherein said step of associating said each counter with a different one of said plurality of processors included within said one or said plurality of nodes and with a different one of said plurality of nodes further comprises the step of temporarily associating said each one of said plurality of counters with a different one of said plurality of threads and with one of said plurality of nodes.

3. The method according to claim 1, further comprising the steps of:

processing a first one of said plurality of threads utilizing a first one of said plurality of processors included within a first node;

determining a row of counters of said counter array included within said first node associated with said first one of said plurality of processors;

determining one of said plurality of nodes including a shared-memory which is accessed by said first one of said plurality of threads;

incrementing a counter included in said row of counters which is associated with both said first one of said plurality of processors and said determined node being accessed by said first one of said plurality of threads.

4. A method in a distributed shared-memory data processing system having a single operating system being executed simultaneously by a plurality of processors included within a plurality of coupled processing nodes for determining a utilization of each of said plurality of processing nodes by each of a plurality of threads being executed by a plurality of processors included within said plurality of nodes, said method comprising the steps of:

establishing a first processing node including a first plurality of said plurality of processors and a first shared-memory, each of said first plurality of said plurality of processors having equal access to said first shared-memory;

for each of said plurality of nodes, establishing an array or counters including a plurality of counters;

establishing a second processing node including a second plurality of said plurality of processors and a second shared-memory, each of said second plurality of said plurality of processors having equal access to sand second shared-memory;

for each one of said plurality of counters included within said array of counters, associating said each one of said plurality of counters with a different one of said plurality of processors included within one of said plurality of nodes within which said array of counters is located and with a different one of said plurality of nodes wherein said array includes a counter associated with each of said plurality of processors for each of said plurality of nodes;

associating each row of counters included in said counter array with a different one of said plurality of processors;

said operating system processing said plurality of threads utilizing said plurality of processors; and determining a utilization of said first and second shared-memories by said plurality of processors during said processing of said plurality of threads by:

determining a quantity of times each one of said first and second plurality of said plurality of processors accesses said first shared-memory utilizing said array of counters; and determining a quantity of times each one of said first and second plurality of said plurality of processors accesses said second shared-memory utilizing said array of counters.

5. The method according to claim 4, wherein said step of associating said each one of said plurality of counters with a different one of said plurality of processors included within said one of said plurality of nodes and with a different one of said plurality of nodes further comprises the step of temporarily associating said each one of said plurality of counters with a different one of said plurality of threads and with one of said plurality of nodes.

6. The method according to claim 4, further comprising the steps of:

processing a first one of said plurality of threads utilizing a first one of said first plurality of processors included within said first node;

determining a row of counters of said counter array included within said first node associated with said first one of said first plurality of processors;

determining one of said plurality of nodes including a shared-memory which is accessed by said first one of said plurality of threads;

incrementing a counter included in said row of counters which is associated with both said first one of said first plurality of processors and said determined node being accessed by said first one of said plurality of threads.

7. A distributed shared-memory data processing system having a single operating system being executed simultaneously by m plurality of processors included within a plurality of coupled processing nodes for determining a utilization of each of said plurality of processing nodes by each of a plurality of threads being executed by a plurality of processors included within said plurality of nodes, comprising:

means for establishing a first processing node including a first plurality of said plurality of processors and a first shared-memory, each of said first plurality of said plurality of processors having equal access to said first shared-memory;

means for establishing a second processing node including a second plurality of said plurality of processors and a second shared-memory, each of said second plurality of said plurality of processors having equal access to said second shared-memory;

means for each of said plurality of nodes, for establishing an array of counters including a plurality of counters;

means for each one of said plurality of counters included within said array of counters, for associating said each of said plurality of counters with a different one of said plurality of processors included within one of said plurality of nodes within which said array of counters is located and with a different one of said plurality of nodes wherein said array includes a counter associated with each of said plurality of processors for each of said plurality of nodes;

means for associating each row of counters included in said counter array with a different one of said plurality of processors;

means within said operating system for processing said plurality of threads utilizing said plurality of processors; and means for determining a utilization of said first and second shared-memories by said plurality of processors during said processing of said plurality of threads by:

determining a quantity of times each one of said first and second plurality of said plurality of processors accesses said first shared-memory utilizing said array of counters; and determining a quantity of times each one of said first and second plurality of said plurality of processors accesses said second shared-memory utilizing said array of counters.

8. The system according to claim 7, wherein said means for associating said each one of said plurality of counters with a different one of said plurality of processors included within said one of said plurality of nodes and with a different one of said plurality of nodes further comprises means for temporarily associating said each one of said plurality of counters with a different ore of said plurality of threads and with one of said plurality of nodes.

9. The system according to claim 7, further comprising:

means for processing a first one of said plurality of threads utilizing a first one of said first plurality of processors included within said first node;

means for determining a row of counters of said counter array included within said first node associated with said first one of said first plurality of processors;

means for determining one of said plurality of nodes including a shared-memory which is accessed by said first one of said plurality of threads; and means for incrementing a counter included in said row of counters which is associated with both said first one of said first plurality of processors and said determined node being accessed by said first one of said plurality of threads.

10. The method according to claim 3, further comprising the steps of:

stopping said processing of said first one of said plurality of threads and starting a processing of a second one of said plurality of threads utilizing said first one of said plurality of processors;

associating a current value of each counter included in said row of counters with said first one of said plurality of threads, storing said current values of each counter included in said row of counters, and resetting each counter included in said row of counters to a value of zero in response to stopping said processing of said first one of said plurality of threads;

determining one of said plurality of nodes including a shared-memory which is accessed by said second one of said plurality of threads;

incrementing a counter included in said row of counters which is associated with both said first one of said plurality of processors and said determined node being accessed by said second one of said plurality of threads.

11. The method according to claim 6, further comprising the steps of:

stopping said processing of said first one of said plurality of threads and starting a processing of a second one of said plurality of threads utilizing said first one of said first plurality of processors;

associating a current value of each counter included in said row of counters with said first one of said plurality of threads, storing said current values of each counter included in said row, and resetting each counter included in said row of counters to a value of zero in response to stopping said processing of said first one of said plurality of threads;

determining one of said plurality of nodes including a shared-memory which is accessed by said second one of said plurality of threads; and incrementing a counter included in said row of counters which is associated with both said first one of said first plurality of processors and said determined node being accessed by said second one of said plurality of threads.

12. The system according to claim 9, further comprising:

means for stopping said processing of said first one of said plurality of threads and starting a processing of a second one of said plurality of threads utilizing said first one of said first plurality of processors;

means for associating a current value of each counter included in said row of counters with said first one of said plurality of threads, storing said current values of each counter included in said row, and resetting each counter included in said row of counters to a value of zero in response to stopping said processing of said first one of said plurality of threads; and means for determining one of said plurality of nodes including a shared-memory which is accessed by said second one of said plurality of threads; and means for incrementing a counter included in said row of counters which is associated with both said first one of said first plurality of processors and said determined node being accessed by said second one of said plurality of threads.

* * * * *

UNITED STATES PATENT AND TRADEMARK OFFICE
CERTIFICATE OF CORRECTION

PATENT NO.    : 6,266,745 B1
DATED         : July 24, 2001
INVENTOR(S)   : De Backer et al.

It is certified that error appears in the above-identified patent and that said Letters Patent is hereby corrected as shown below:

Column 8,
Line 67, please change "or" to -- of --;

Column 9,
Line 57, please change "m" to -- a --;

Column 10,
Line 41, please change "ore" to -- one --.

Signed and Sealed this

Twenty-second Day of July, 2003

JAMES E. ROGAN
*Director of the United States Patent and Trademark Office*